United States Patent
Kokkinos et al.

(10) Patent No.: US 12,217,391 B2
(45) Date of Patent: Feb. 4, 2025

(54) SPATIALLY ADAPTIVE IMAGE FILTERING

(71) Applicant: HUAWEI TECHNOLOGIES CO., LTD., Shenzhen (CN)

(72) Inventors: Filippos Kokkinos, London (GB); Ioannis Marras, London (GB); Matteo Maggioni, London (GB); Stefanos Zafeiriou, London (GB); Gregory Slabaugh, London (GB)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 334 days.

(21) Appl. No.: 17/742,703

(22) Filed: May 12, 2022

(65) Prior Publication Data
US 2022/0277430 A1    Sep. 1, 2022

Related U.S. Application Data

(63) Continuation of application No. PCT/EP2019/081370, filed on Nov. 14, 2019.

(51) Int. Cl.
G06T 5/20       (2006.01)
G06V 10/44      (2022.01)
G06V 10/82      (2022.01)

(52) U.S. Cl.
CPC ........... *G06T 5/20* (2013.01); *G06V 10/451* (2022.01); *G06V 10/82* (2022.01); *G06T 2207/20004* (2013.01); *G06T 2207/20084* (2013.01)

(58) Field of Classification Search
CPC .......... G06V 10/82; G06V 10/451; G06T 2207/20004; G06T 2207/20084; G06T 5/00–94
See application file for complete search history.

(56) References Cited

U.S. PATENT DOCUMENTS 9,013,511 B2    4/2015   Liang et al.
9,996,902 B2    6/2018   Milanfar et al.
(Continued)

FOREIGN PATENT DOCUMENTS

CN    108520505 A    9/2018

OTHER PUBLICATIONS

Getreuer et al âBLADE: Filter Learning for General Purpose Computational Photographyâ IEEE 2018 (Year: 2018).*
(Continued)

*Primary Examiner* — Sean T Motsinger
(74) *Attorney, Agent, or Firm* — Maier & Maier, PLLC (57) ABSTRACT

An image processor for transforming an input image, the image processor being configured to implement a trained artificial intelligence model, where the image processor is configured to: receive the input image; based on one or both of (i) the content of the input image and (ii) features extracted from the input image, process the image by the trained artificial intelligence model to: (i) determine a set of image filters; and (ii) for each of a plurality of subregions of the image, select an image filter from the set of image filters; and for each of the plurality of subregions of the image, apply the respective image filter to the subregion or to features extracted from that subregion. This may allow for differentiable selection of filters from a discrete learnable and decorrelated group of filters to allow for content based spatial adaptations.

13 Claims, 4 Drawing Sheets

(56) References Cited

U.S. PATENT DOCUMENTS

| | | | | |
|---|---|---|---|---|
| 10,796,414 | B2* | 10/2020 | Vogels | G06V 10/82 |
| 2007/0183684 | A1 | 8/2007 | Bhattacharjya | |
| 2015/0325023 | A1 | 11/2015 | Gross | |
| 2016/0321523 | A1* | 11/2016 | Sen | G06V 10/774 |
| 2018/0137417 | A1 | 5/2018 | Theodorakopoulos et al. | |
| 2018/0293711 | A1* | 10/2018 | Vogels | G06F 17/10 |
| 2019/0035113 | A1* | 1/2019 | Salvi | G06N 3/084 |
| 2019/0311248 | A1* | 10/2019 | Fleishman | G06N 3/045 |
| 2019/0328460 | A1* | 10/2019 | Ronen | A61B 34/20 |
| 2020/0126191 | A1* | 4/2020 | Munkberg | G06T 5/70 |
| 2020/0126192 | A1* | 4/2020 | Munkberg | G06T 5/70 |
| 2020/0311490 | A1* | 10/2020 | Lee | G06T 5/60 |
| 2021/0133938 | A1* | 5/2021 | Lee | G06N 3/08 |
| 2021/0142448 | A1* | 5/2021 | Yao | G06N 3/044 |
| 2022/0207336 | A1* | 6/2022 | Kim | G06N 3/084 |
| 2022/0277430 | A1* | 9/2022 | Kokkinos | G06T 5/20 |

OTHER PUBLICATIONS

Brabandere et al âDynamic Filter Networksâ arXiv Jun. 6, 2016 (Year: 2016).*

Brabandere et al., "Dynamic Filter Networks", 30th Conference on Neural Information Processing Systems (NIPS 2016), Barcelona, Spain, 9 pages, XP055711953.

Mildenhall et al., "Burst Denoising with Kernel Prediction Networks", Proceedings of the IEEE Conference on Computer Vision and Pattern Recognition, 2018, 9 pages.

Bako et al., "Kernel-Predicting Convolutional Networks for Denoising Monte Carlo Renderings", ACM Transactions on Graphics, vol. 36, No. 4, Article 97, Jul. 2017, 14 pages, XP058372871.

Gumbel, "Statistical Theory of Extreme Values and Some Practical Applications", A Series of Lectures, No. 33, National Bureau of Standards Applied Mathematics Series, Feb. 12, 1954, 58 pages.

Su et al., "Pixel-Adaptive Convolutional Neural Networks", arXiv:1904.05373v1 [cs.CV], Apr. 10, 2019, 13 pages, XP033687149.

He et al., "Deep Residual Learning for Image Recognition", 2016 IEEE Conference on Computer Vision and Pattern Recognition, 9 pages.

Su et al., "Pixel-Adaptive Convolutional Neural Networks", CVPR 2019, 10 pages.

Getreuer et al., "BLADE: Filter Learning for General Purpose Computational Photography", 2018 IEEE, 11 pages.

Buades et al., "A non-local algorithm for image denoising", 2005 IEEE Computer Society Conference on Computer Vision and Pattern Recognition (CVPR''05), 6 pages.

Romano et al., "RAISR: Rapid and Accurate Image Super Resolution", IEEE Transactions on Computational Imaging, vol. 3, No. 1, Jan. 2017, 16 pages.

Kokkinos et al., "Iterative Joint Image Demosaicking and Denoising using a Residual Denoising Network", Journal of Transactions in Image Processing, arXiv:1807.06403v3 [cs.CV], Mar. 29, 2019, 12 pages.

Kokkinos et al., "Pixel Adaptive Filtering Units", arXiv:1911.10581v1 [cs.CV], Nov. 24, 2019, 10 pages.

* cited by examiner

SPATIALLY ADAPTIVE IMAGE FILTERING

CROSS-REFERENCE TO RELATED APPLICATIONS

This application is a continuation of International Application No. PCT/EP2019/081370, filed on Nov. 14, 2019, the disclosure of which is hereby incorporated by reference in its entirety.

FIELD

The embodiments are related to image processing and the filtering of images.

BACKGROUND

Convolution is a mathematical operation that expresses the amount of overlap of one signal as it is shifted over another signal. Convolution is a critically important part of a convolutional neural network (CNN), which uses convolutional layers to extract features from an image (or from the output of a previous layer). In a CNN, the convolutional filter weights (forming a kernel) are learned, and through this process, convolutional layers extract optimized information useful for solving a task such as image denoising or classification.

As such, convolutions in general and convolutional layers in particular act as fundamental operations to successfully analyze images in many image processing and high-level computer vision problems. The sharing of learnable kernels allows for a simple way to extract task-specific features. Furthermore, these operations can be implemented in an optimized and parallel way, which allows for fast processing of images and videos of arbitrary size.

Besides the supremacy of convolutions, once the kernels are learned, the processing of any input may be identical. In detail, the content agnostic nature of convolutions is driven from the fact that the same kernels are applied on all positions of any image irrespective of the content; a property known as spatial equivariance.

However, in practice both the content and the conditions vary, which inescapably forces the deployment of more training data, augmentations and learnable parameters that constitute a naïve solution to the problem at hand. A paradigm shifting approach is to use content-adaptive filtering, which modulates the processing of an input according to statistical cues that are derived from an image or a dataset. Therefore, different images will undergo a unique analysis based on the content that is depicted.

Methods have previously been proposed in order to achieve content-adaptivity. Non-Local Means and Bilateral Filtering utilize features and neighborhood statistics in order to modulate the filtering of an image according to the content. With the advent of deep learning, many of these spatially varying techniques have been adopted in a differentiable manner and used as layers in existing neural networks.

Many methods for computer vision rely heavily on the translation equivariance and spatial sharing properties of convolutional layers without explicitly taking into consideration the input content. Conventionally, when performing convolution, the same kernels are applied on all positions of any image irrespective of the content. However, in practice the image content varies considerably from region to region in an image. To cope with this variability, convolutional neural networks require more training data (larger datasets and/or data augmentations) and a greater number of learnable parameters, which increases memory and runtime.

Recently, deep neural networks have been developed that predict, per pixel, the convolutional kernels that need to be used. In practice, this can be restricting since a large number of parameters needs to be learned in order to predict large convolutional kernels, such as those commonly found in an image classification deep CNN. For example, in Mildenhall, Ben, et al. "Burst denoising with kernel prediction networks," Proceedings of the IEEE Conference on Computer Vision and Pattern Recognition, 2018, a deep neural network is used with millions of parameters in order to predict how a set/burst of images need to be properly aligned and later merged into one artifact-free image.

It is desirable to develop a method that overcomes these problems.

SUMMARY

According to one embodiment, there is provided an image processor for transforming an input image, the image processor being configured to implement a trained artificial intelligence model, wherein the image processor is configured to: receive the input image; based on one or both of (i) the content of the input image and (ii) features extracted from the input image, process the image by the trained artificial intelligence model to: (i) determine a set of image filters; and (ii) for each of a plurality of subregions of the image, select an image filter from the set of image filters; and for each of the plurality of subregions of the image, apply the respective image filter to the subregion or to features extracted from that subregion.

Each of the plurality of subregions may be a pixel of the input image. A pixel is one of many areas of the image from which the image is composed. For example, an image may comprise 64×64 pixels. This may allow the filter applied to each pixel of the image to be determined based on the content of the pixel or the area around the pixel.

For each of the plurality of subregions of the image, the selected image filter may be applied to the features extracted from that subregion, and the features extracted from the subregion of the input image may be defined in the form of a tensor. This may allow the filter to be applied at an intermediate stage of the image processing operation.

The image processor may be further configured to, for each of the plurality of subregions of the image, select an image filter from the set of image filters based on one or both of (i) the content of the respective subregion of the image and (ii) features extracted from the respective subregion of the image. This may allow an appropriate filter to be applied to a particular pixel of the image.

The image processor may be further configured to, for each of the plurality of subregions of the image, select an image filter from the set of image filters based on one or both of (i) the content of an area around the respective subregion of the image and (ii) features extracted from the areas around the respective subregion of the image. Consideration of the area around a subregion, such as a pixel, may allow an appropriate filter to be applied to a particular pixel of the image.

The trained artificial intelligence model may be a convolutional neural network. This may be a convenient implementation.

The convolutional neural network may comprise a regularizer which enforces variability to the learned set of image filters. Regularizing the set of filters during training to be decorrelated may result in a set of unique and diverse operators.

The set of image filters may comprise a pre-defined number of discrete filters. Each image filter of the set of image filters may be unique from the other members of the set. This may avoid a group of redundant kernels.

Each image filter of the set of image filters may be a kernel. A kernel is a group of filters. This may allow more than one filter to be applied to a subregion of an image in an image operation.

The set of image filters may comprise kernels having at least two different sizes. The approach may therefore support kernels of arbitrary size.

The image processor may be configured to perform one or more of the following image operations: demosaicking, superresolution, semantic segmentation, and image classification. Therefore, the approach may be used in a range of low- and high-level computer vision problems.

According to a second embodiment, there is provided a method for implementation at an image processor for transforming an input image, the image processor being configured to implement a trained artificial intelligence model, the method comprising: receiving the input image; based on one or both of (i) the content of the input image and (ii) features extracted from the input image, processing the image by the trained artificial intelligence model to: (i) determine a set of image filters; and (ii) for each of a plurality of subregions of the image, select an image filter from the set of image filters; and for each of the plurality of subregions of the image, applying the respective image filter to the subregion or to features extracted from that subregion.

Each of the plurality of subregions may be a pixel of the input image. This may allow the filter applied to each pixel of the image to be determined based on the content of the pixel or the area around the pixel.

The set of image filters may comprise a pre-defined number of discrete filters. Obtaining a group of learnable and decorrelated filters or kernels may promote content-based image enhancement.

BRIEF DESCRIPTION OF THE FIGURES

The embodiments will now be described by way of example with reference to the accompanying drawings. In the drawings.

DETAILED DESCRIPTION OF THE EMBODIMENTS

Described herein is a filtering unit for an image processor that can perform differentiable selection of filters from a discrete learnable and decorrelated group of filters. The selection may be made per pixel (or other subregion of the image) and thus the computation changes spatially according to the content of the input. The selection of the filters may be performed using a compact CNN network which is trained implicitly to select filters based on features it extracts from the input. The end result is the spatially varying application of the filters to the image or tensor to be filtered.

A common way of implementing a convolutional layer in CNNs is a matrix vector product between a kernel $W \in \mathbb{R}^{k \times k \times c_{out} \times c_{in}}$ (a group of filters) with support size k and an input $x \in \mathbb{R}^{h \times w \times c_{in}}$. The kernel W linearly transforms the input channels $c_{in}$ to $c_{out}$ which by design takes into consideration the inter-channel correlations.

The output $y \in \mathbb{R}^{c_{out}}$ is formed as:

$$y_{ij} = \Sigma_{a,b \in \mathcal{N}_k(i,j)} W_{i-a,j-b} x_{ab} \qquad (1)$$

where the neighborhood is defined as $\mathcal{N}_k(i,j) = \{a, b \| a-i \| \le k/2, |b-j| \le k/2\}$.

As can be seen in Equation (1), the same weights are applied on every position of x. This is a known property of convolutional layers which is known as translation equivariance. While this property has driven progress in computer vision tasks, weight sharing across all positions is not effective to properly produce a spatially varying output. This intrinsic failure results from the fact that the loss gradients from all image positions are fed into global kernels which are trained to minimize the error in all locations. The same problem arises in practice in a wide variety of problems which require a dense prediction or regression such as image segmentation, restoration, and enhancement.

Instead of applying the same kernel on all pixels as described above, the method described herein selectively breaks the equivariance by selecting which filters (or kernels) from a discrete group should be deployed on which locations of an image. This is termed spatially varying convolution. The group of kernels $\hat{W} \in \mathbb{R}^{n \times k \times k \times c_{out} \times c_{in}}$ can contain n discrete kernels. In this case the spatially varying convolutional layer is defined as:

$$y_{ij} = \Sigma_{a,b \in \mathcal{N}_k(i,j)} \hat{W}_{z_{ij}, i-a, j-b} x_{ab} \qquad (2)$$

where $z \in \mathbb{R}^{h \times w \times n}$ is a one-hot encoded index that indicates which kernel out of n kernels in the group should be selected for every pixel. The selection indices z are predicted from a kernel selection mechanism f given the image to be filtered as input, i.e., z=f(x). It can be seen from Equation 2 that different regions of an image are filtered with distinct kernels from $\hat{W}$ thus selectively breaking the translation equivariance property of convolutional layers.

An example of the kernel selection mechanism will now be described.

The discrete selection of kernels based on the input content can be learned using available training data. In order to extract features of interest, a compact CNN may be used that receives as input an image or embeddings $x \in \mathbb{R}^{h \times w \times n}$ and gives as output probabilities $z \in \mathbb{R}^{h \times w \times n}$. These probabilities represent the likelihood that each filter is most suitable for a particular pixel. The CNN may be trained implicitly to select the best kernel from the group, which is also simultaneously learned, by minimizing a task specific loss.

In an example, the selection may be applied to be discrete and to deploy on each pixel the most confident arg max $z_{ij}$ kernel from the group according to the kernel selection CNN. However, the arg max function is non-differentiable and therefore not suitable to be used as a core component in modern deep learning literature.

The issue of discrete selection may be addressed using a differentiable relaxation of the Gumbel-Max Trick (as described in Emil Julius Gumbel, "Statistical theory of extreme values and some practical applications: a series of lectures," Number 33, US Govt. Print. Office, 1954, and Xu Jia, Bert De Brabandere, Tinne Tuytelaars, and Luc V Gool, "Dynamic filter networks", Advances in Neural Information Processing Systems, pages 667-675, 2016), which proposes that sampling of a discrete random variable can be converted into a deterministic selection given. The arg max operation of the Gumbel-Trick may be replaced with a soft max, which is differentiable, and a temperature τ, as follows:

$$\hat{X}_k = \text{soft max}((\log a_k + G_k)/\tau) \quad (3)$$

When τ→0 the softmax function approximates asymptotically an argmax function, while in the case τ→∞ the approximation returns samples from a uniform distribution. The straight-through version of the Gumbel-softmax estimator may be used, which during the forward pass discretizes the selection to be binary while the backward pass is calculated based on the continuous selection probabilities z. The straight-through estimator allows for faster convergence and intuitive kernel selection maps, no matter the apparent inconsistency between the forward and backward pass which theoretically leads to biased gradient estimation.

A possible component for robust selection is a regularizer enforcing variability to the set of learnable filters. This form of regularization penalizes the naïve solution where all filters are identical and the filter selection per pixel can be as good as chance. Simultaneously, filters that are dissimilar with each other act as unique linear operators or feature extractors when used in deep neural networks. Their application will yield different results, which increases the expressivity of the learnable group of filters or kernels by suppressing any redundancies. In order to maximize dissimilarity and enforce variability, the cosine distance between the kernels in a group can be penalized. This may be achieved by normalizing first and stacking afterwards all kernels on a matrix $W_f \in R^{n \times n_p}$, where $n_p$ is the number of parameters in a kernel, and then minimizing the regularization loss:

$$\mathcal{L}_R = \|W_f W_f^T - I\|_F^2 \quad (4)$$

where I is the identity matrix.

In the case where kernels of different support sizes are deployed, the kernels may be padded to the maximum support size before the formation of matrix $W_f$. The model may be trained with decorrelation regularization alongside task specific losses according to:

$$\mathcal{L} = \mathcal{L}_{task} + \mathcal{L}_R \quad (5)$$

In the event where more than one filtering module is utilized, the regularization loss may be the average of the individual losses.

To address the limitations of spatial equivariant convolutional filtering, the content-adaptive filtering technique described herein modulates the processing of an input according to statistical cues that are derived from an image or a dataset. Therefore, different images will undergo a unique analysis based on the content that is depicted.

For each of the plurality of subregions of the image, the unit can select an image filter from the set of image filters based on one or both of (i) the content of the respective subregion of the image and (ii) features extracted from the respective subregion of the image. The unit may select an image filter from the set of image filters based on the content of (or features extracted from) a subregion or an area around a subregion. This may allow an appropriate filter to be applied to a particular subregion of the image.

Similarly to a conventional CNN, in a convolutional layer, a set of convolutional kernels is learned to provide task-specific filters. However, a filter selection mechanism is also learned that identifies which kernel to apply at each pixel. This way, the convolutional filtering can vary from pixel to pixel in the image.

Therefore, there are two main inter-related features of the approach:

Selecting the best filter (from a discrete set) to apply to each pixel in the image or tensor. The filter selection mechanism may be implemented as a classifier using a lightweight convolutional neural network.

Learning task-specific filters during training, which allows for the formation of a discrete set of filters. Redundancy between filters is penalized, in order to produce sets that are unique from one another.

At inference, the optimal filter is selected at each pixel, resulting in spatially varying convolution. This adapts the processing locally depending on the image content. These two features may achieve content-dependent filtering of images to handle image processing and computer vision tasks.

Instead of applying the same kernel on all pixels, the technique described herein may selectively break the equivariance by picking which kernels from a discrete group should be deployed at which locations of an image. The group of kernels may contain a pre-defined number of discrete kernels. Obtaining a group of learnable and decorrelated kernels promotes content-based image enhancement.

The filter selection mechanism is learned using available training data. In order to extract features of interest, a compact CNN can be used that receives as input an image or embeddings and gives as output probabilities. The CNN can be trained implicitly to select the best kernel from the group, which is also simultaneously learned, by minimizing a task specific loss.

In an example, the selection is discrete and for each pixel the most confident kernel (i.e., the filter with the highest probability for a particular pixel) from the group is deployed according to the kernel selection CNN by deploying a differentiable selection technique.

A possible component for robust selection is a regularizer enforcing variability to the group of learnable kernels. This form of regularization penalizes the naive solution where all kernels are identical and the kernel selection per pixel can be as good as chance. Simultaneously, kernels that are dissimilar with each other act as unique linear operators or feature extractors when used in deep neural networks. Their application will yield different results which increases the expressivity of the learnable group of kernels by suppressing any redundancies. In order to maximize dissimilarity and enforce variability, the cosine distance between the kernels in a group is penalized.

Figure 1:
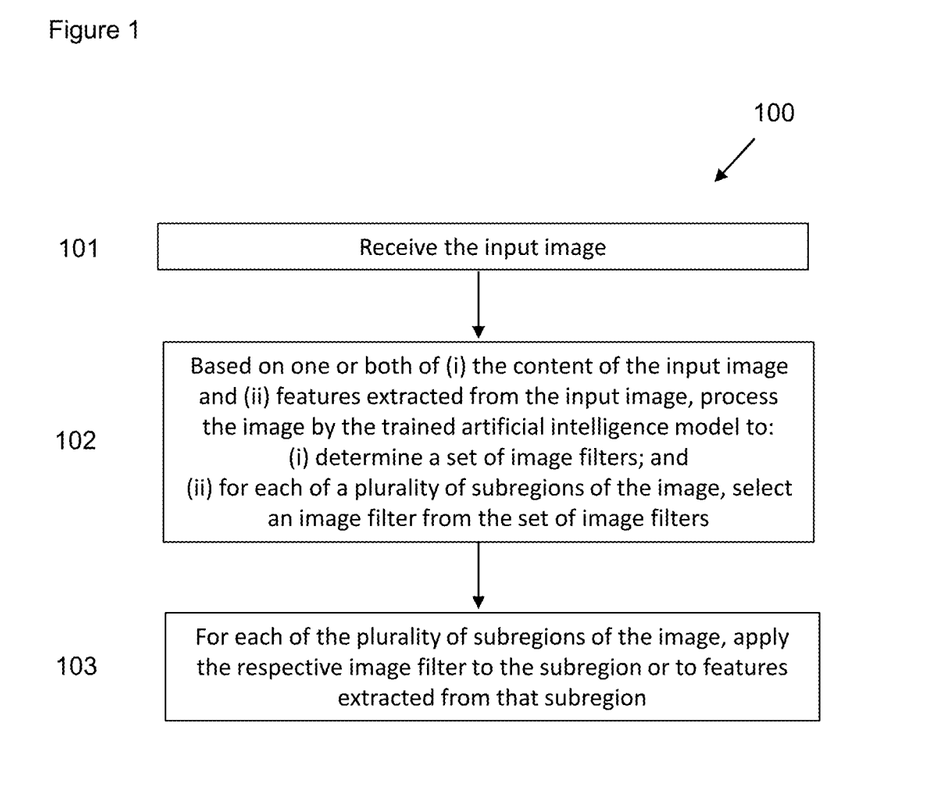
FIG. 1 shows an example of a method for implementation at an image processor for transforming an input image.

FIG. 1 shows an example of a method 100 for implementation at an image processor for transforming an input image, the image processor being configured to implement a trained artificial intelligence model. At step 101, the method 100 comprises receiving the input image. At step 102, based on one or both of (i) the content of the input image and (ii) features extracted from the input image, the image is processed by the trained artificial intelligence model to: (i) determine a set of image filters; and (ii) for each of a plurality of subregions of the image, select an image filter from the set of image filters. At step 103, for each of the plurality of subregions of the image, the respective image filter is applied to the subregion or to features extracted from that subregion.

Figure 2:
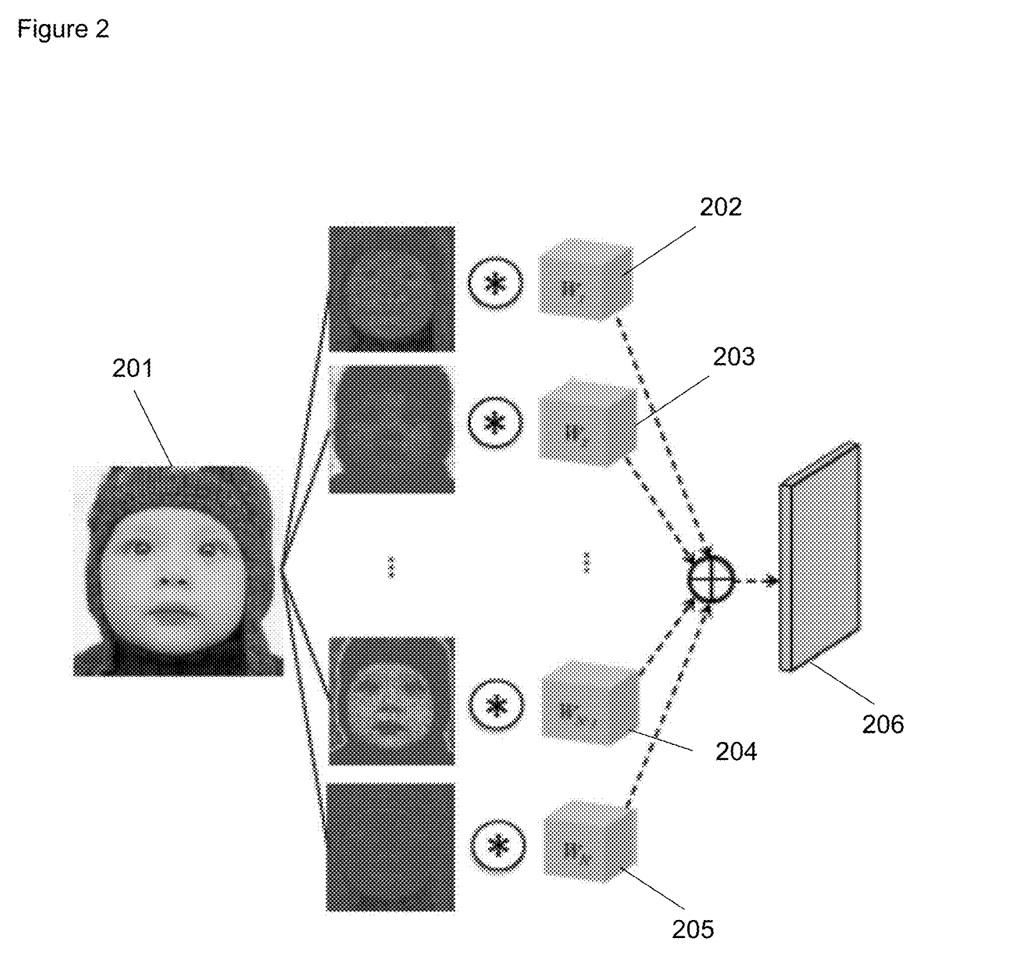
FIG. 2 illustrates an example of the method described herein to an input image in a spatially adaptive filtering unit.

FIG. 2 illustrates application of this method 100 to an input image 201 in a spatially adaptive filtering unit. The unit calculates a pixel-wise selection of the kernels $W_i$, shown at 202-205. Then, the kernels $W_i$ are applied on the original input according to the predicted selection pattern.

The output of the unit is a tensor with an arbitrary number of output channels, shown at 206.

Figure 3:
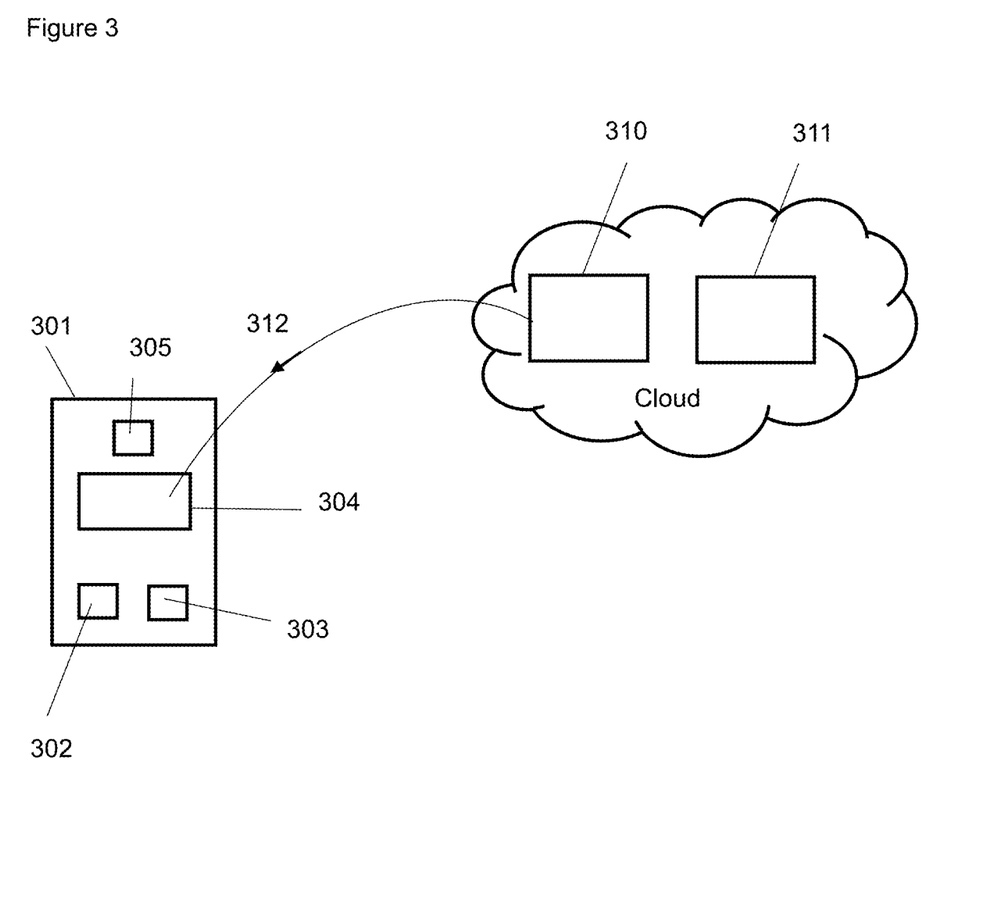
FIG. 3 shows an example of a camera configured to implement the method described herein.

FIG. 3 shows an example of a camera 301 configured to implement the image processor to process images taken by an image sensor 302 in the camera 301. Such a camera 301 typically includes some onboard processing capability. This could be provided by the processor 304. The processor 304 could also be used for the essential functions of the device. The camera 301 typically also comprises a memory 303.

The transceiver 305 is capable of communicating over a network with other entities 310, 311. Those entities may be physically remote from the camera 301. The network may be a publicly accessible network such as the internet. The entities 310, 311 may be based in the cloud. In one example, entity 310 is a computing entity and entity 311 is a command and control entity. These entities are logical entities. In practice they may each be provided by one or more physical devices such as servers and datastores, and the functions of two or more of the entities may be provided by a single physical device. Each physical device implementing an entity comprises a processor and a memory. The devices may also comprise a transceiver for transmitting and receiving data to and from the transceiver 305 of the camera 301. The memory stores in a non-transient way code that is executable by the processor to implement the respective entity in the manner described herein.

The command and control entity 311 may train the artificial intelligence models used in each module of the system. This is typically a computationally intensive task, even though the resulting model may be efficiently described, so it may be efficient for the development of the algorithm to be performed in the cloud, where it can be anticipated that significant energy and computing resource is available. It can be anticipated that this is more efficient than forming such a model at a typical camera.

In one implementation, once the deep learning algorithms have been developed in the cloud, the command and control entity 311 can automatically form a corresponding model and cause it to be transmitted to the relevant camera device. In this example, the system is implemented at the camera 301 by processor 304.

In another possible implementation, an image may be captured by the camera sensor 302 and the image data may be sent by the transceiver 305 to the cloud for processing in the system. The resulting target image could then be sent back to the camera 301, as shown at 312 in FIG. 3.

Therefore, the method may be deployed in multiple ways, for example in the cloud, on the device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g., using an inference engine. The system may also be implemented at the camera, in a dedicated piece of hardware, or in the cloud.

The method is applicable to both linear and non-linear low- and high-level computer vision problems, for example in dense prediction and regressions tasks, as well as standard image classification. The unit may be used to replace convolutional layers in standard neural networks for the tasks of image demosaicking, superresolution, image classification, and segmentation, or combinations therefore (such as joint denoising and demosaicking problems).

The method may be applied on an explicit linear domain for the problem of demosaicking and super-resolution, where the runtime performance is of importance. In both problems, in some implementations, experimental results surpassed the performance of competing linear methods whilst simultaneously achieving competitive accuracy with popular non-linear approaches. Furthermore, the proposed filtering unit may replace convolutional layers in established deep neural networks proposed in literature for the aforementioned problems as well as classification and segmentation tasks.

For the linear case, as a first step, the method can be trained and tested as an oneshot linear solution for image processing tasks. Note that while the kernel selection mechanism is non-linear, the application of the selected kernel per pixel constitutes a pure linear transformation. Although the expressiveness of the method is restricted in this form, the end-result is an application which runs in real-time and yet achieves competitive performance with more complex and non-linear systems. Simultaneously, the method allows for group of kernels with different support sizes.

Figure 4:
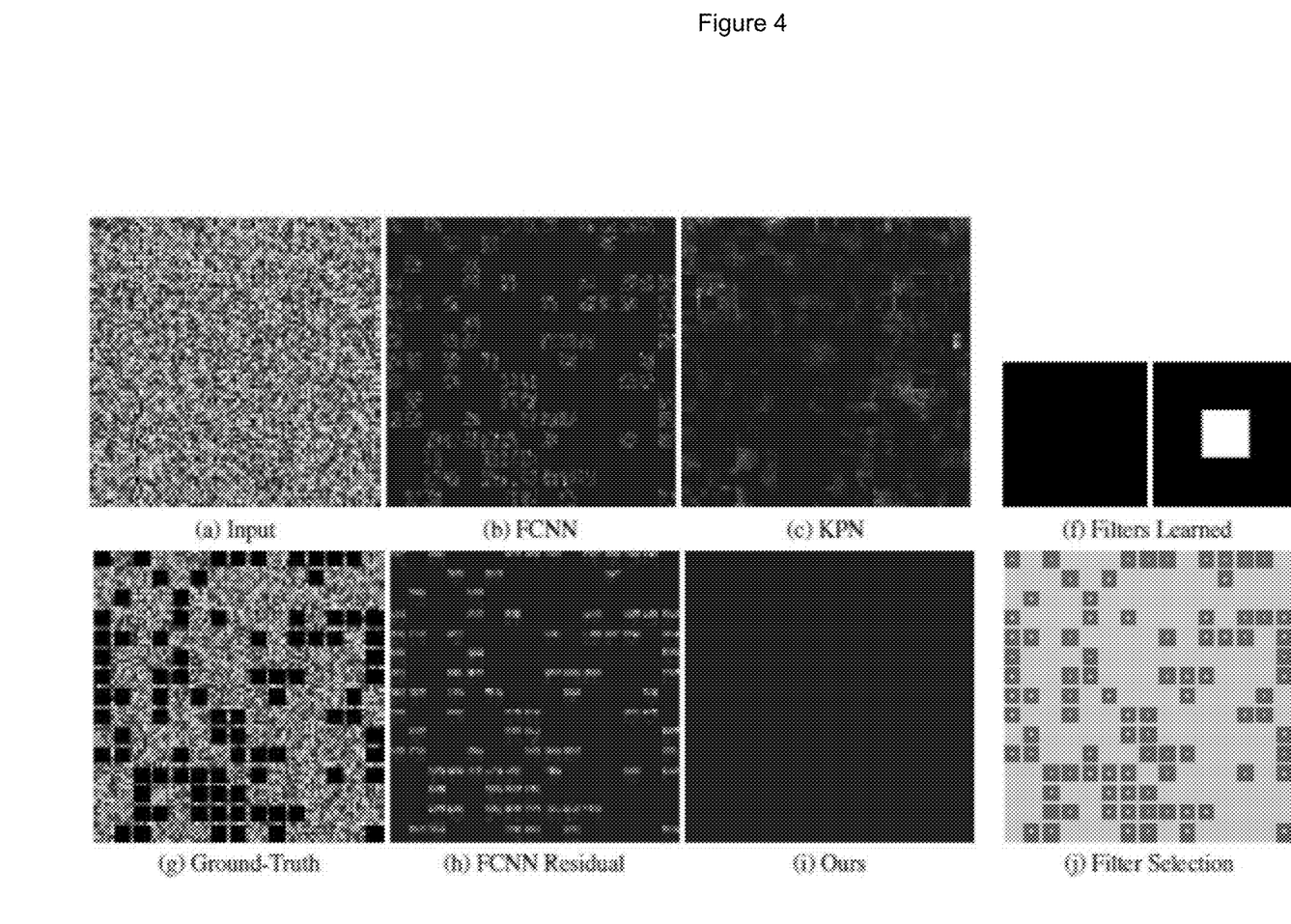
FIG. 4 shows a comparison of the method described herein and other methods on a spatially adaptive dataset.

FIG. 4 shows a comparison between the method described herein and other methods on a Spatially Adaptive Dataset (SAD). The SAD contains images of dimension 89×89 with random uniform color noise sampled from (0; 1] and black pixels sampled randomly from a predefined square grid with dimension 87×87 as in FIG. 4(*a*). The aim is to dilate all black pixels to 5×5 black squares, which may have no overlap as it is depicted in the ground truth of FIG. 4(*g*), while keeping all other values unaltered. The minimal optimal solution comprises of two filters; a Dirac filter and a zero filter. For pixels with random noise only, the Dirac filter will leave them unaltered after filtering while the zero filter will dilate the black pixels to squares. The solution can therefore be characterized as both minimal and optimal. Note that black pixels located in the input image can be filtered with both filters without any difference as in FIG. 4(*j*). The examined methods shown in FIG. 4 consist of a fully-convolutional neural network (FCNN) in FIG. 4(*b*), a Residual FCNN in FIG. 4(*h*), a KPN (kernel prediction network) in FIG. 4(*c*) and the approach described herein in FIG. 4(*i*). All of the aforementioned methods were trained to minimize the $l_1$ loss between the output and the ground truth and have approximately the same number of parameters (nearly 35K). As can be seen from FIG. 4, methods that solely rely on translation invariant convolutions may not yield adequate results and the reason lies in the fact that they apply the same kernels to every location of the input image. Therefore, in this implementation, other methods struggle to learn the correct mapping. The two learned utilized filters are shown in in FIG. 4(*f*) alongside the filter selection heatmap in FIG. 4(*j*).

Instead of modulating or predicting kernels, the approach described herein performs differentiable selection of filters from a discrete learnable and decorrelated group of filters to allow for content based spatial adaptations. The selection can advantageously be made per pixel of the image and thus the computational graph changes spatially according to the content of the input. The selection of the filters can be performed using a compact CNN network which can be trained implicitly to select filters based on features it extracts from the input. The end result is the spatially varying application of the filters on the image or tensor to be filtered.

The formulation allows for fast and robust kernel selection with minimal overhead that depends on the number of kernels of a group. Therefore, it may support kernels of arbitrary size.

Simultaneously, the set of filters or kernels can be regularized during training to be decorrelated and thus constitutes a set of unique and diverse operators. In other words, this regularized group of filters or kernels is enforced to have high variability, hence avoiding the naive solution of a group of redundant kernels.

A performance improvement has been experimentally observed across several computer vision tasks which provides strong empirical evidence for the need of spatial adaptivity and the benefits of selective filtering. The technique may result in improved image quality for image restoration purposes. Simultaneously, the described method may achieve better classification per pixel or per image than prior methods for high-level computer vision tasks.

The spatially varying convolution may allow the method to produce an output with zero error and learn the optimal filter set. A filter selection heatmap can be generated to depict which filters were selected per pixel. It can be seen whether the selection between the two optimal filters is the proper one to produce minimal error. When compared to a KPN, the method is capable of achieving lower error, while KPN fails to predict a Dirac filter for the majority of the pixels that would require such a filter.

With regards to computation overheard, the spatially varying convolution can be implemented in a parallel way using the standard im2col and col2im operations that break the spatial resolution of images into appropriate patches according to the kernel support sizes. Afterwards the patches can be easily filtered using a matrix vector operation per pixel as described in Equation (2). The same implementation is also a known fast solution for the spatially invariant convolution, however modern computation libraries apply a set of low-level optimization techniques to gain considerable execution time reduction.

The filtering unit may be deployed both as a standalone unit or as a part of a deep neural network.

The processor and method described herein are particularly advantageous for use in applications where runtime is of importance. The unit can be employed consecutively in conjunction with deep neural networks as a replacement of standard convolutional layers and enhance the original architectures with spatially varying computations, which in return may provide considerable performance improvement.

This method therefore provides the very appealing advantage of spatial adaptivity; an important component that is absent from many standard convolutional units, such as those commonly found in CNNs.

Each individual feature described in the embodiments herein and any combination of two or more such features, to the extent that such features or combinations are capable of being carried out as a whole in the light of the common general knowledge of a person skilled in the art, irrespective of whether such features or combinations of features solve any problems described herein, and without limitation to the scope of the embodiments. Aspects of the embodiments may include any such individual feature or combination of features. In view of the foregoing description, it will be evident to a person skilled in the art that various modifications may be made within the scope of the embodiments.

The invention claimed is:

1. An image processor for transforming an input image, the image processor being configured to implement a trained artificial intelligence model, wherein the image processor is configured to:
   receive the input image;
   based on one or both of (i) the content of the input image and (ii) features extracted from the input image, process the image by the trained artificial intelligence model to:
   (i) determine a set of image filters; and
   (ii) for each of a plurality of subregions of the image, select an image filter from the set of image filters; and
   for each of the plurality of subregions of the image, apply the respective image filter to the subregion or to features extracted from that subregion;
   wherein the trained artificial intelligence model is a convolutional neural network comprising a regularizer which enforces variability to a learned set of image filters.

2. The image processor of claim 1, wherein each of the plurality of subregions is a pixel of the input image.

3. The image processor of claim 1, wherein, for each of the plurality of subregions of the image, the selected image filter is applied to the features extracted from that subregion, and wherein the features extracted from the subregion of the input image are defined in the form of a tensor.

4. The image processor as claimed in claim 1, wherein the image processor is further configured to, for each of the plurality of subregions of the image, select an image filter from the set of image filters based on one or both of (i) the content of the respective subregion of the image and (ii) features extracted from the respective subregion of the image.

5. The image processor as claimed in claim 1, wherein the image processor is further configured to, for each of the plurality of subregions of the image, select an image filter from the set of image filters based on one or both of (i) the content of an area around the respective subregion of the image and (ii) features extracted from the areas around the respective subregion of the image.

6. The image processor as claimed in claim 1, wherein the set of image filters comprises a pre-defined number of discrete filters.

7. The image processor as claimed in claim 1, wherein each image filter of the set of image filters is unique from the other members of the set.

8. The image processor as claimed in claim 1, wherein each image filter of the set of image filters is a kernel.

9. The image processor as claimed in claim 8, wherein the set of image filters comprises kernels having at least two different sizes.

10. The image processor as claimed in claim 1, wherein the image processor is configured to perform one or more of the following image operations: demosaicking, superresolution, semantic segmentation, and image classification.

11. A method for implementation at an image processor for transforming an input image, the image processor being configured to implement a trained artificial intelligence model, the method comprising:
   receiving an input image;
   based on one or both of (i) the content of the input image and (ii) features extracted from the input image, processing the image by a trained artificial intelligence model to:
   (i) determine a set of image filters; and
   (ii) for each of a plurality of subregions of the image, select an image filter from the set of image filters; and
   for each of the plurality of subregions of the image, applying the respective image filter to the subregion or to features extracted from that subregion;
   wherein the trained artificial intelligence model is a convolutional neural network comprising a regularizer which enforces variability to a learned set of image filters.

12. The method for implementation at an image processor for transforming an input image of claim 11, wherein each of the plurality of subregions is a pixel of the input image.

13. The method for implementation at an image processor for transforming an input image of claim 11, wherein the set of image filters comprises a pre-defined number of discrete filters.

\* \* \* \* \*